Figure 1:
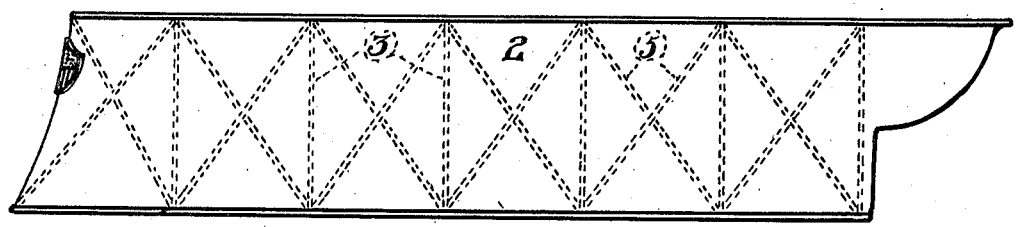

C. GORA.
VESSEL.
APPLICATION FILED DEC. 28, 1912. RENEWED MAR. 19, 1915.

1,138,862.  Patented May 11, 1915.

UNITED STATES PATENT OFFICE.

CHARLES GORA, OF ATHABASKA LANDING, ALBERTA, CANADA.

VESSEL.

1,138,862.  Specification of Letters Patent.  Patented May 11, 1915.

Application filed December 28, 1912, Serial No. 738,991. Renewed March 19, 1915. Serial No. 15,656.

*To all whom it may concern:*

Be it known that I, CHARLES GORA, a subject of the Emperor of Austria-Hungary, residing at Athabaska Landing, Alberta, Canada, have invented certain new and useful Improvements in Vessels, of which the following is a specification, reference being had therein to the accompanying drawing.

This invention relates to ocean going vessels, and the object of my invention is to provide a vessel with a double hull, the inner and outer hulls being spaced apart by ribs that divide the space between the hulls into air-tight compartments, the puncture of one of said compartments not impairing the use of the vessel as the other compartments are sufficient in number to maintain the vessel intact and afloat.

My invention is applicable to various types of boats, particularly those that encounter ice bergs, floating debris and other matter that is liable, in connection with an ordinary single hull boat, to stave in or puncture the sides of the boat and cause the same to sink. My improvement can therefore be considered as a life-saving device and the improvement does not interfere with the interior arrangement of a vessel or reduce the speed of the same in a body of water.

The invention will be hereinafter specifically described and then claimed, and reference will now be had to the drawing, wherein:—

Figure 2:
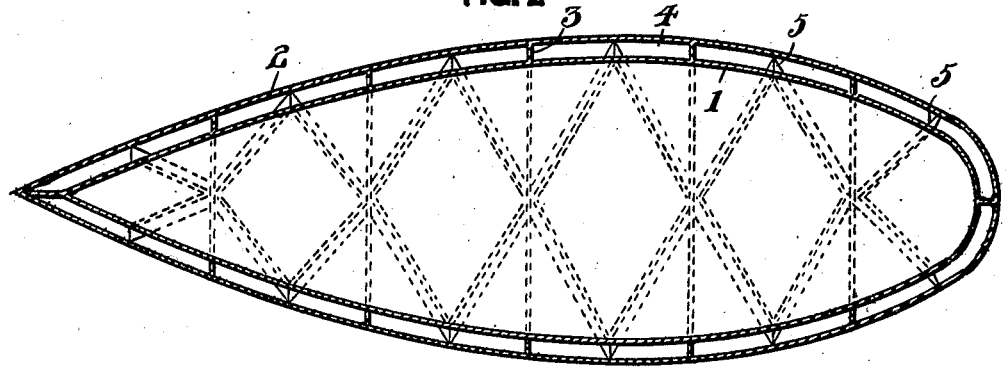
Figure 3:
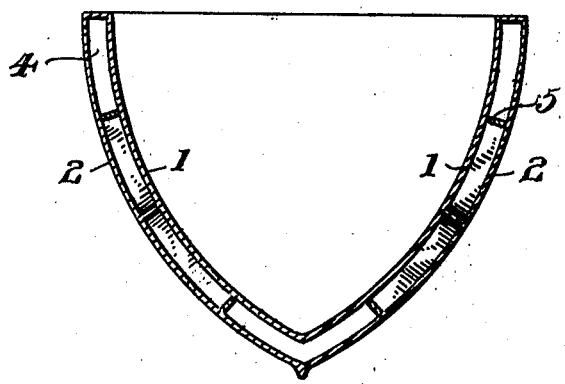

Figure 1 is a side elevation of a vessel in accordance with this invention, Fig. 2 is a horizontal sectional view of the same, and Fig. 3 is a cross sectional view of the vessel.

A vessel in accordance with this invention comprises an inner hull 1 and an outer hull 2, the hull 2 being spaced apart from the hull 1 with the inner wall of the outer hull in proximity with the outer wall of the inner hull. The inner and outer hulls are connected by integral transversely arranged webs 3 that are equally spaced throughout the length of the vessel, said webs providing transverse compartments 4. The compartments 4 between the inner and outer hulls are subdivided by angularly disposed ribs 5 that intersect at each side of the vessel and divide each of the compartments 4 into seven compartments, each of which is airtight. The ribs 5 can be riveted or otherwise connected to the hulls 1 and 2 and at the bow and stern of the vessel the ribs are disposed to add rigidity to the hulls and prevent said hulls from buckling by a head or rear on collision.

It is apparent should the outer hull be punctured or pierced that the usefulness of the vessel is not impaired, nor is there any danger of the same sinking. The airtight subdivided compartments increase the buoyancy of the vessel and reduce to a minimum any danger of the vessel sinking from external causes.

What I claim is:—

A vessel comprising inner and outer hulls, the outer hull being spaced apart from the inner hull with the confronting sides thereof in parallelism and connected by integral transversely arranged equally spaced webs providing transverse air compartments, and angularly disposed ribs connecting said inner and outer hulls within the compartments thereof and dividing each air compartment into a plurality of compartments.

In testimony whereof I affix my signature in the presence of two witnesses.

CHARLES GORA.

Witnesses:
 JOSEPH JANY,
 LEIGH SMITH.